United States Patent [19]

Hsu

[11] Patent Number: 4,958,424
[45] Date of Patent: Sep. 25, 1990

[54] DEVICE FOR FITTING A HOSEL ON A CLUB SHAFT

[76] Inventor: Paul K. H. Hsu, 1 Fl., No. 1-2, Lane 30, Sec. 2, Hsing Sheng S. Rd., Taipei, Taiwan

[21] Appl. No.: 426,981

[22] Filed: Oct. 26, 1989

[51] Int. Cl.$^5$ .............................................. B23P 19/04
[52] U.S. Cl. ..................................................... 29/252
[58] Field of Search ................ 29/251, 252, 227; 254/10.5, 29 R

[56] References Cited

U.S. PATENT DOCUMENTS

| | | | |
|---|---|---|---|
| 4,477,956 | 10/1984 | Mefford | 29/252 |
| 4,571,807 | 2/1986 | Hines et al. | 29/252 |
| 4,704,780 | 11/1987 | Moffett | 29/252 |
| 4,754,539 | 7/1988 | Knoll et al. | 29/252 |
| 4,763,394 | 8/1988 | Decato et al. | 29/252 |

Primary Examiner—Robert C. Watson
Attorney, Agent, or Firm—Rogers, Howell & Haferkamp

[57] ABSTRACT

A device for fitting a hosel on a club shaft including a holder seat mounted on two rails. A horizontal pneumatic cylinder is provided to control a horizontal movement of the holder seat. Two holders are provided to hold the club shaft during the fitting of the club shaft with a hosel. A vertical plate, which has a hole in alignment with the axis of a club shaft to be fitted with a hosel, is provided on a first end of the holder seat with an assembling cylinder rod mounted in the hole for the fitting of the hosel on the club shaft.

1 Claim, 4 Drawing Sheets

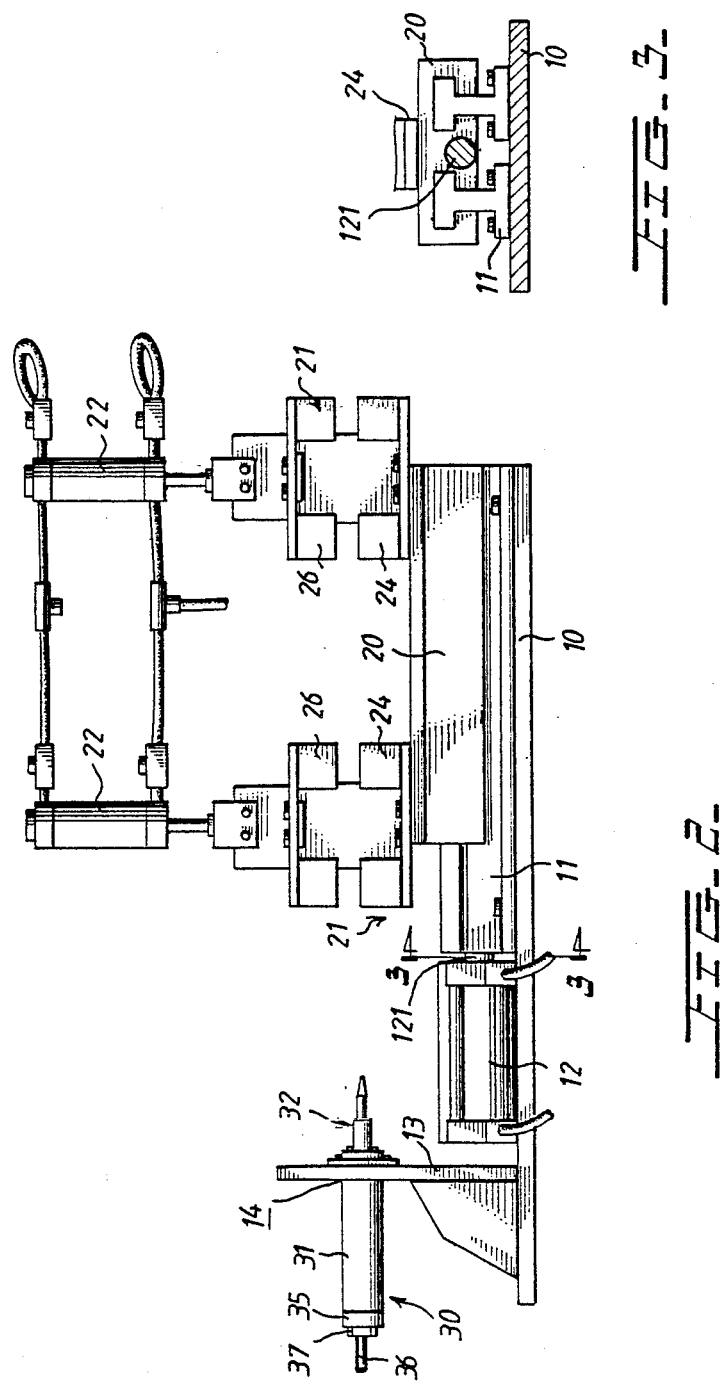

DEVICE FOR FITTING A HOSEL ON A CLUB SHAFT

BACKGROUND OF THE INVENTION

The present invention relates to a device for fitting a hosel on a club shaft.

Generally, a hosel in the shape of a truncated cone is provided above the neck portion of a golf club for esthetical purpose. The hosel provides the golf club with a smooth outline and makes the whole golf club look more valuable.

Nevertheless, it is not easy to fit a hosel on a club shaft since the hosel and the club shaft must be tightly bonded. Conventionally, a club shaft is inserted into a hosel within a mold by hand. Accordingly, such an assembly is neither convenient nor efficient. Furthermore, most commonly, the hosel is randomly fitted on the end of the club shaft which brings problems in the subsequent assembly of the club, since the club shaft must be inserted into the hosel to such a length that the neck and the head can be subsequently assembled. It is also very impractical to use manual techniques in the fitting of the club shaft with the hosel. The manually fitted hosels are often in an improper position which causes problems in the subsequent assembly of the neck and the head and generates products of low quality.

SUMMARY OF THE INVENTION

It is an object of the present invention to provide a device for fitting a hosel on a club shaft for increasing the quality thereof.

It is another object of the present invention to provide a device for fitting a hosel on a club shaft which fits the dimensions of various types of club shafts.

It is still another object of the present invention to provide a device for fitting a hosel on a club shaft wherein the processing is easier to achieve.

These and additional objects, if not set forth specifically herein, will be readily apparent to those skilled in the art from the detailed description provided hereinbelow, with appropriate reference to the accompanying drawings.

BRIEF DESCRIPTION OF THE DRAWINGS

FIG. 2 is a front elevational view of the device for fitting a hosel on a club shaft in accordance with the present invention;

FIG. 3 is a partial cross-sectional view along line 3—3 in FIG. 2;

DETAILED DESCRIPTION OF THE PREFERRED EMBODIMENTS

Figure 1:
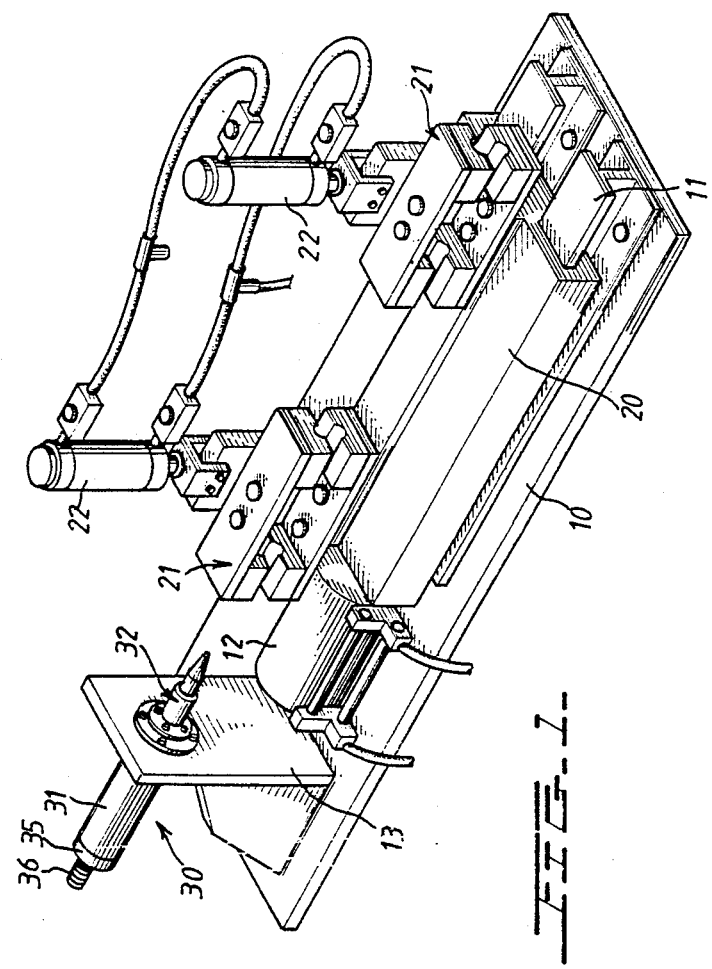
FIG. 1 is a perspective view of a device for fitting a hosel on a club shaft in accordance with the present invention.

Referring to FIG. 1, a device for fitting a hosel on a club shaft according to the present invention is shown. The device comprises a base 10 having two rails 11 mounted thereon. The two rails 11 are parallel to each other. A holder seat 20 having a flat upper surface engages with the two rails 11 and is slidable on the two rails along a length thereof.

A horizontal pneumatic cylinder 12 is mounted on the base 10 on a first end of the two rails 11 and a piston 121 of the pneumatic cylinder 12 is in alignment with a middle portion of the base 10. An end of the piston 121 of the horizontal pneumatic cylinder 12 is connected to the holder seat 20 to control a horizontal movement of the holder seat 20 on the two rails 11 via the piston 121 as clearly shown in FIGS. 2 and 3.

The two holders 21 are provided for holding a club shaft 40 to be fitted with a hosel 41. Each holder 21 consists of a fixed lower part 24 and a movable upper part 26. The two lower parts 24 are in alignment with each other and fixed on a middle portion of the upper surface of the holder seat 20. The two upper parts 26 of the holders 21 are also in alignment with each other and respectively actuated by two corresponding vertical pneumatic cylinders 22 to move in a vertical orientation above the two lower parts 24. The two upper parts 26 and the two lower parts 24 of the holders 21 respectively mate with each other and cooperatively hold the club shaft 40 during the fitting of the hosel 41 on the club shaft 40.

A vertical plate 13 is mounted on the base 10 adjacent a first end of the horizontal pneumatic cylinder 12. The vertical plate 13 has a hole 14 with its center positioned in alignment with a longitudinal axis of the club shaft 40 placed on the two lower parts 24 of the holders 21 for fitting of the hosel 41.

Figure 5:
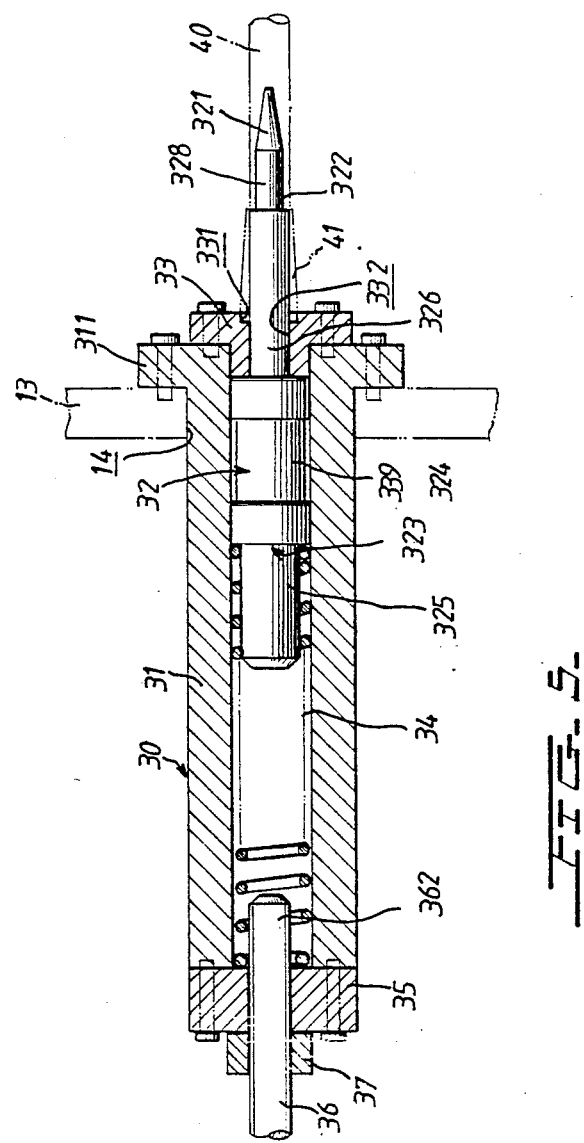
FIG. 5 is a cross-sectional view of an assembling cylinder and a vertical plate of the device for fitting a hosel on a club shaft in accordance with the present invention, wherein a hosel and a club shaft are placed at their pre-set positions for fitting.

Referring to the figures, especially in detail to FIGS. 5 and 6, an assembling cylinder 30 is fixed onto the vertical wall 13 via the hole 14. The assembling cylinder 30 is substantially a hollow cylinder having a casing 31 and a first end as well as a second end. The first end of the assembling cylinder 30 is sealed by a cap 35. The cap 35 has an inner threaded hole for a positioning screw 36 to pass therethrough. The positioning screw 36 penetrates into an interior of the assembling cylinder 30 and thereby defines an inserted portion 362 of the positioning screw 36 and is movable lengthwise within the assembling cylinder 30. A fastening nut 37 is provided on an outer side of the cap 35 to fix the positioning screw 36 and thereby determine the position of the positioning screw 36.

The assembling cylinder 30 further has a flange 311 formed on a periphery of the second end thereof. The assembling cylinder 30 is fixed onto the vertical plate 13 via the flange 311 by providing screws as in other conventional methods. The assembling cylinder 30 has a rod 32 slidably received therein. The rod 32 comprises a block 329 having a first side 323 and a second side 324. A first projection 325 protrudes from the first side 323 of the block 329 and a second projection 326 protrudes from the second side 324 of the block 329. The first projection 325 has an outside diameter smaller than the inside diameter of the cylinder 30. A return spring 34, preferably a coil spring, is provided between the first end of the block 329 and an inner wall of the cap 35 wherein the first projection 325 and the inserted portion 362 of the positioning screw 36 are accommodated in the return spring 34. A third projection 328 protrudes from the second rojection 326 and forms a shoulder portion 322 thereof.

The second projection 326 has an outside diameter the same as an inside diameter of a narrower end of the truncated-cone-formed hosel 41. The rod 32 is partially restrained in the assembling cylinder 30 by means of a thrust cap 33. The thrust cap 33 is fixed to the flange 311 by screws or other conventional means. A recess 331 having a corresponding shape to a larger end of the hosel 41 is centrally formed on the thrust cap 33 at a first side thereof. A bore 332 is centrally formed in the recess 331 and has a diameter the same as the diameter of the second projection 326. The third projection 328 further has a tapering portion 321 for the third projection 328 to pass easily into the hosel 41 and the club shaft 40 so that the hosel 41 and the club shaft 40 respectively cover the second projection 326 and the third projection 328. The rod 32 is restrained in the assembling cylinder 30 such that the seconnd side 324 of the block 329 abuts an inner surface of the thrust cap 33 and the return spring 34 is neuturally positioned between the first side 323 of the block 329 and the inner wall of the cap 35.

Operation

Figure 4:
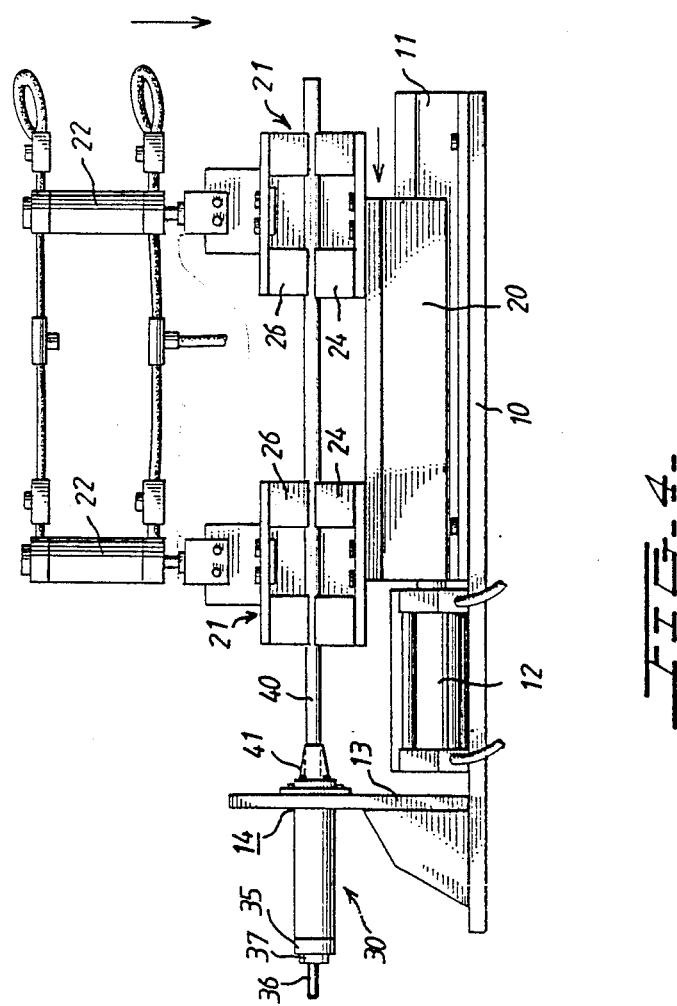
FIG. 4 is a schematic view showing the movement of two holders and a holder seat of the device for fitting a hosel on a club shaft.

Referring to FIGS. 4, 5 and 6, in the operation of the present invention, the holder seat 20 as well as the two lower parts 24 of the two holders 21 rest at the right most position of the rails 11. The third projection 328 pass through the larger end of the hosel 41 and protrudes from the narrower end of the hosel 41 with the second projection 326 positioned in the hosel 41. The hosel 41 rests on a bottom surface of the recess 331 with the smaller end of the hosel 41 located at the shoulder portion 322 of the second projection 326. The club shaft 40 is placed on concave sections of the two fixed lower parts 24 of the two holders 21 and an end of the club shaft 40 which is desired to be fitted with the hosel 41 covers the third projection 328 and abuts the shoulder portion 322 of the second projection 326. After the hosel 41 and the club shaft 40 are positioned, the movable upper parts 26 of the two holders 21 are moved down by the two vertical cylinders 22 and mate with each corresponding fixed lower parts 24 thereby clamping the club shaft 40 into the two holders 21 on the holder seat 20.

The holder seat 20 is moved leftward by the horizontal cylinder 12 progressively. The rod 32 is actuated to overcome the return spring 34 and move leftward until the first projection 325 is stopped by the inserted portion 362 of the positioning screw 36. Accordingly, the club shaft 40 is inserted into the hosel 41 since the hosel 40 is stopped by the bottom surface of the recess 331 and does not move with respect to the movement of the club shaft 40.

It will be appreciated that the amount the club shaft 40 is inserted into the hosel 41 can be predetermined by adjusting the positioning screw 36.

The holder seat 20 is then moved rightward by the horizontal cylinder 12 after the fitting of the hosel 41 on the club shaft 40. The return spring 34 pushes the rod 32 back to its original position in order to proceed with the subsequent fitting of another hosel on another club shaft.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A device for fitting a hosel on a club shaft, comprising:

a base;

two rails being parallel to each other and mounted on said base;

a holder seat having a flat upper surface being engaged with said two rails and being slidable on said two rails along a length of said rails;

a horizontal pneumatic cylinder being mounted on said base at a first end of said two rails and in alignment with a middle portion of said base, said horizontal pneumatic cylinder having a piston with an exposed end connected to said holder seat, said holder seat being actuated by said horizontal pneumatic cylinder to slide on said two rails along the length of said rails via said piston;

two holders being parallel to each other and provided above said holder seat for holding a club shaft, each of said two holders consisting of a fixed lower part mounted on said flat upper surface of said holder seat and a movable upper part actuated by two corresponding vertical pneumatic cylinders to move in a vertical orientation; said two movable upper parts mating with corresponding said fixed lower parts to hold the club shaft during the fitting of a hosel on said club shaft;

a vertical plate being mounted on said base adjacent a first end of said horizontal pneumatic cylinder, said vertical plate having a hole with its center positioned in alignment with a longitudinal axis of said club shat placed on said two lower parts of said two holders;

an assembling cylinder being fixed onto said vertical wall with a second end inserted in said hole, said assembling cylinder being substantially a hollow cylinder having a casing and a first end as well as said second end, said first end of said assembling cylinder being sealed by a cap, said cap having an inner threaded hole for a positioning screw to pass therethrough, said positioning screw penetrating into an interior of said assembling cylinder and thereby defining an inserted portion of said positioning screw and being lengthwise movable within said assembling cylinder, a fastening nut being provided on an outer side of said cap to fix said positioning screw and determine a position of said positioning screw;

said assembling cylinder further having a flange formed on a periphery of said second end thereof, said assembling cylinder being fixed onto said vertical plate via said flange by screws, said assembling cylinder having a rod slidably received therein, said rod comprising a block having a first side and a second side, a first projection protruding from said first side of said block and a second projection protruding from said second side of said block, said first projection having an outside diameter smaller than an inside diameter of said assembling cylinder, a return spring being provided between said first end of said block and an inner wall of said cap wherein said first projection and said inserted portion of said positioning screw are accommodated in said return spring, a third projection protruding from said second projection and forming a shoulder portion therebetween;

said second projection having an outside diameter the same as a diameter of a narrower end of said hosel, said rod being partially restrained in said assembling cylinder by a thrust cap, said thrust cap being fixed to said flange by screws, a recess having a corresponding shape to a larger end of said hosel being centrally formed on said thrust cap at a first side thereof for a larger end of said hosel to abut therein, a bore being centrally formed in said recess and having a diameter the same as an outside diameter of said second projection, said third projection having a tapering portion to pass through said hosel and said club shaft such that said hosel and said club shaft respectively cover said second projection and said third projection, said rod being restrained in said assembling cylinder such that said second side of said block abuts an inner surface of said thrust cap and said return spring is neuturally positioned between said first side of said block and said inner wall of said cap, said return spring being pressed in response to a horizontal movement of said holder seat actuated by said horizontal pneumatic cylinder till said first projection is stopped by said inserted portion during the fitting of said hosel on said club shaft, said return spring pushing said rod back to its original position after the fitting of said hosel on said club shaft.

* * * * *